United States Patent
Sakamoto et al.

(10) Patent No.: US 7,911,929 B2
(45) Date of Patent: Mar. 22, 2011

(54) OPTICAL DISK READ ONLY MEMORY

(75) Inventors: Tetsuhiro Sakamoto, Kanagawa (JP); Jun Nakano, Tokyo (JP); Takayuki Asahina, Shizuoka (JP); Hideo Kawachi, Tokyo (JP); Yoshitake Yanagisawa, Shizuoka (JP); Makoto Tsukahara, Shizuoka (JP); Inho Cho, Gyeongsangnam-do (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 12/329,024

(22) Filed: Dec. 5, 2008

(65) Prior Publication Data

US 2009/0147664 A1 Jun. 11, 2009

(30) Foreign Application Priority Data

Dec. 11, 2007 (JP) ................................ P2007-319511

(51) Int. Cl.
*G11B 7/24* (2006.01)
(52) U.S. Cl. ................ 369/275.4; 369/275.3; 369/275.1
(58) Field of Classification Search .............. 369/275.4, 369/275.1, 275.3, 275.2, 13.54, 13.55; 428/64.1, 428/64.4; 430/321, 320, 270.1, 270.11, 270.13; 720/718
See application file for complete search history.

(56) References Cited

U.S. PATENT DOCUMENTS

| | | | | | |
|---|---|---|---|---|---|
| 5,862,121 | A | * | 1/1999 | Suzuki | 369/275.1 |
| 6,144,742 | A | * | 11/2000 | Gotoh et al. | 369/53.21 |
| 6,414,913 | B1 | * | 7/2002 | Kobayashi et al. | 369/14 |
| 6,788,635 | B1 | * | 9/2004 | Aratani et al. | 369/100 |
| 7,072,260 | B1 | | 7/2006 | Sako et al. | |
| 7,177,264 | B2 | * | 2/2007 | Aratani et al. | 369/288 |
| 7,236,439 | B2 | | 6/2007 | Usui et al. | |
| 7,573,803 | B2 | * | 8/2009 | Kikukawa et al. | 369/275.1 |
| 7,790,263 | B2 | * | 9/2010 | Nakano et al. | 428/64.1 |
| 2002/0015369 | A1 | * | 2/2002 | Kobayashi | 369/53.21 |
| 2002/0067674 | A1 | * | 6/2002 | Schneck et al. | 369/53.22 |

FOREIGN PATENT DOCUMENTS

| | | |
|---|---|---|
| JP | 2001-135021 | 5/2001 |
| WO | WO 01/08145 A1 | 2/2001 |
| WO | WO 02/101733 A1 | 12/2002 |

* cited by examiner

*Primary Examiner* — Tan X Dinh
(74) *Attorney, Agent, or Firm* — Oblon, Spivak, McClelland, Maier & Neustadt, L.L.P.

(57) ABSTRACT

An optical disk read only memory having an information recording surface with a concave-convex pattern formed on the basis of a first signal and a reflective film covering the surface. The disc medium includes: an additional information recording section formed on a recording track of a first data string; and a second data string including a mark of removing or reducing the reflective film. The modulation methods of the first and the second data strings are identical, and $Lh(n) > Lp1(n)$ and $Wh(n) > (Wp1(n)+Wp2(n))/2$ are satisfied, where a reference clock cycle is T, a data length is nT, a length and a width of the mark are $Lh(n)$ and $Wh(n)$, a length and a width of a base of the pit are $Lp1(n)$, and $Wp1(n)$, a length and a width of a top face of the pit is $Lp2(n)$ exceeding $Lp1(n)$, and $Wp2(n)$ exceeding $Wp1(n)$.

3 Claims, 15 Drawing Sheets

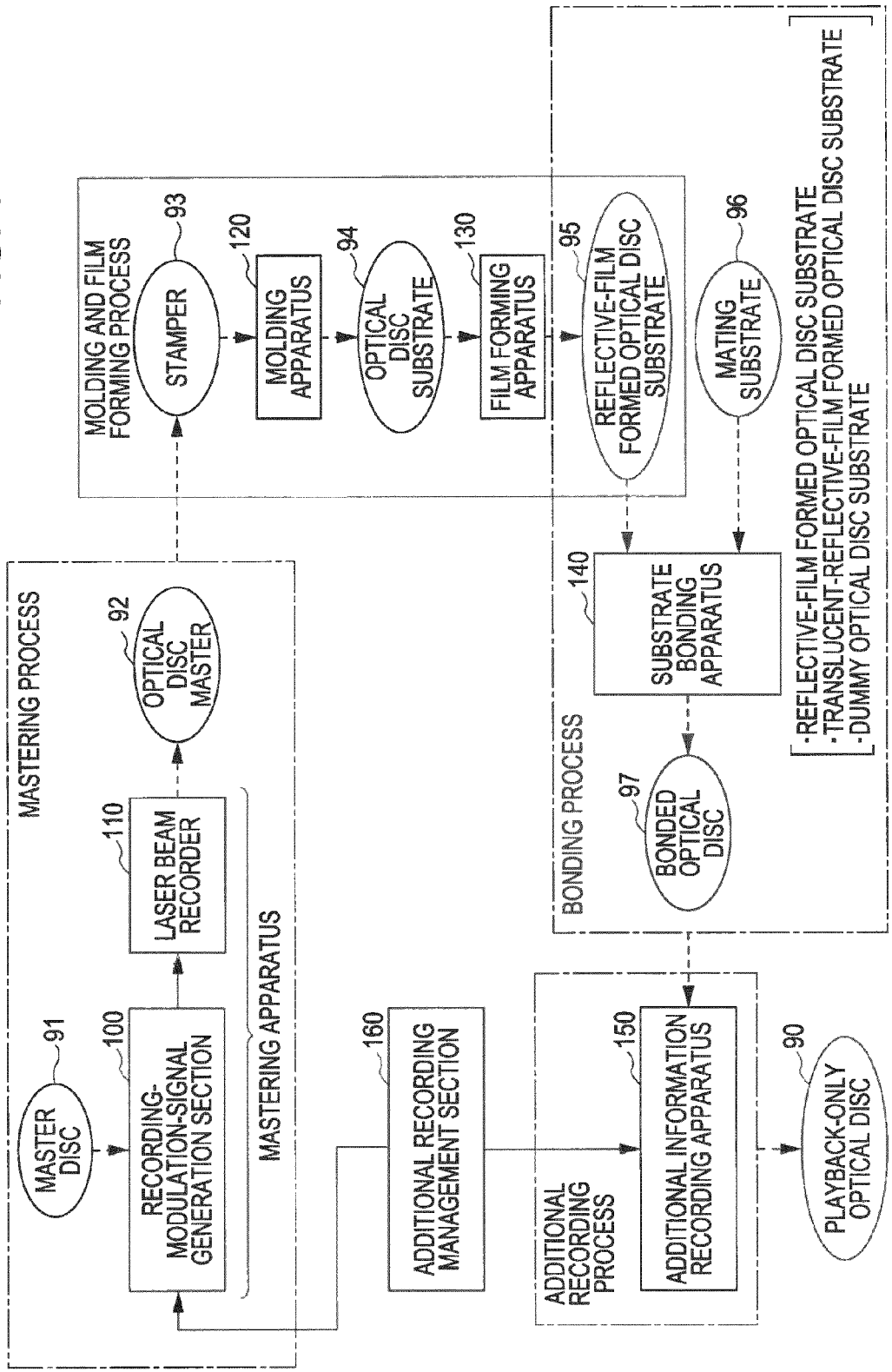

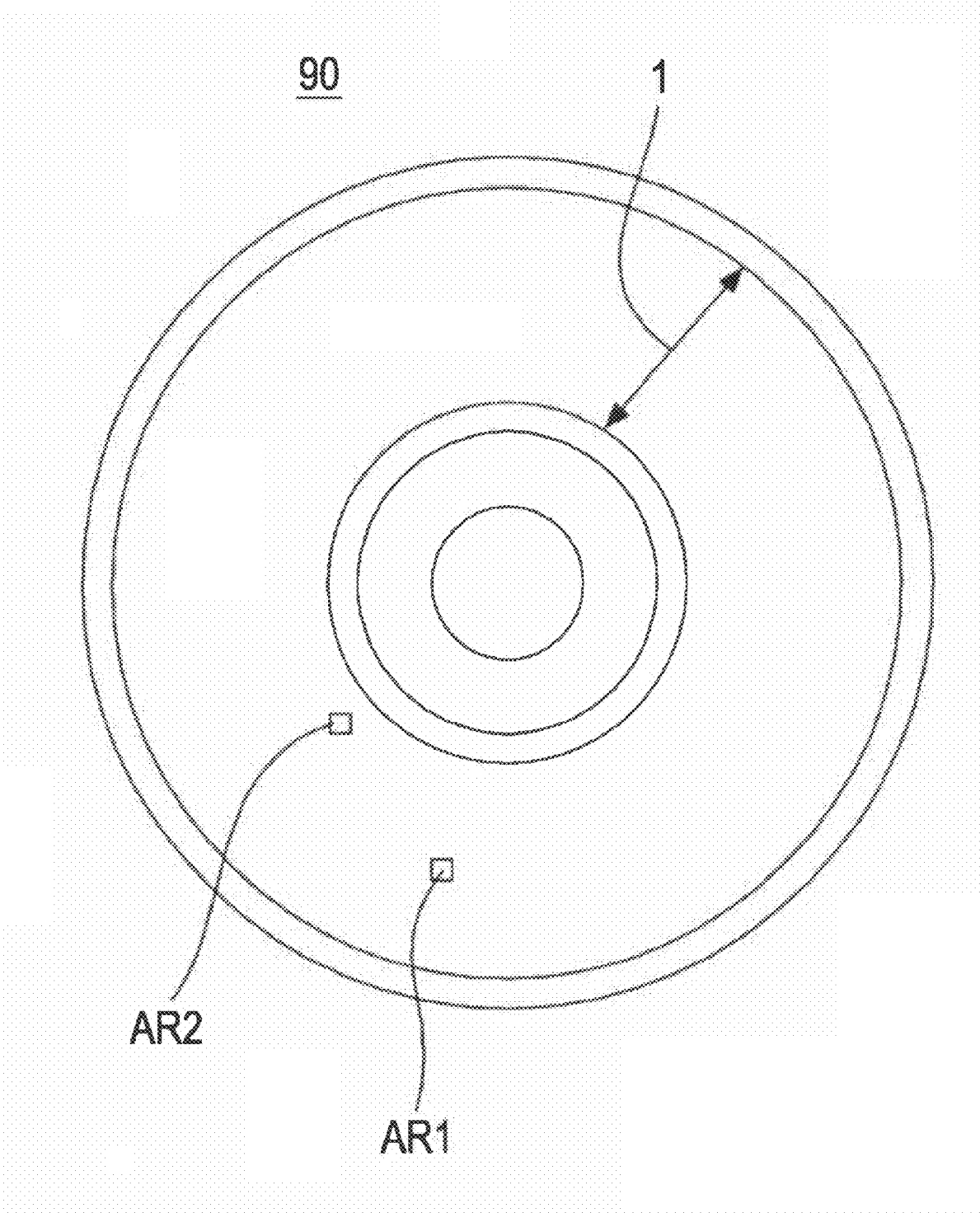

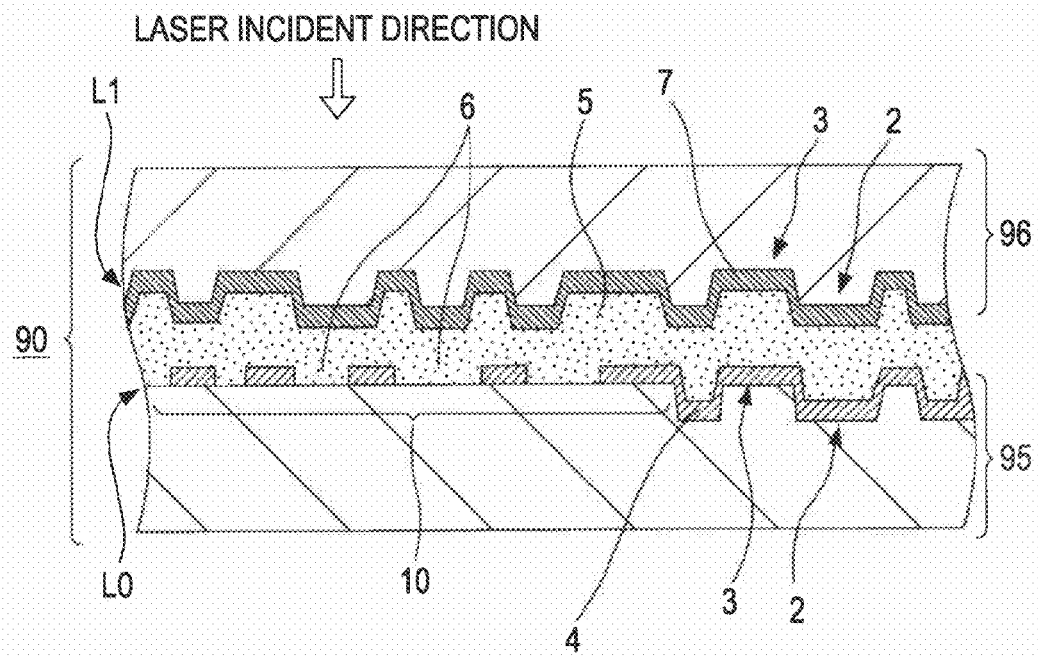
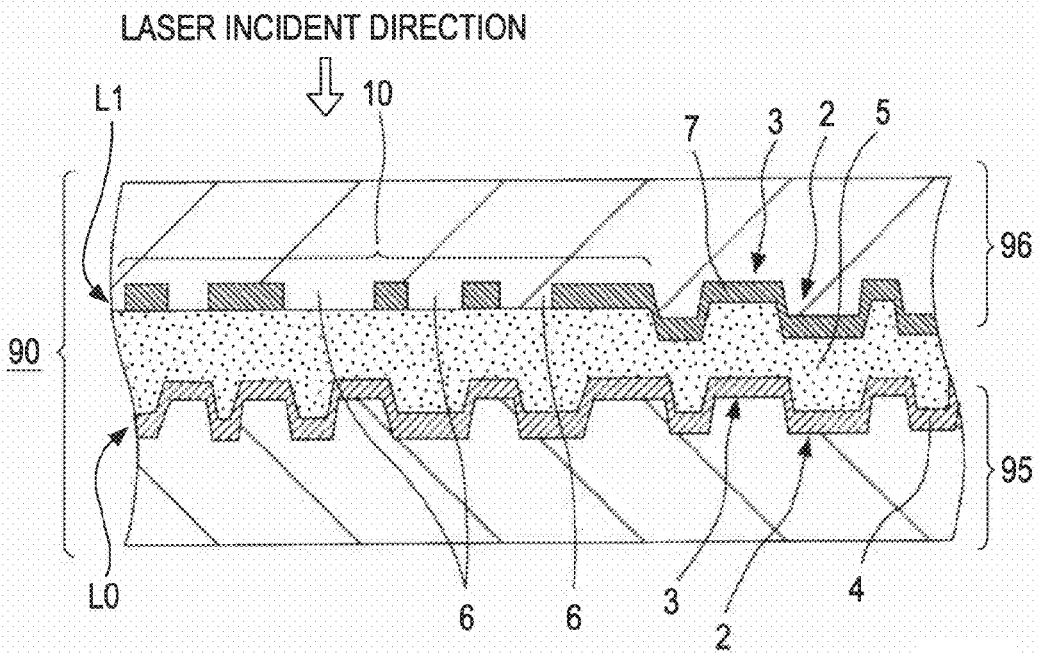

FIG. 15

|  |  | n=3 (3T) | n=5 (5T) | n=6 (6T) | n=10 (10T) |
|---|---|---|---|---|---|
| PIT | Lp1(n) | 0.268 | 0.567 | 0.709 | 1.315 |
|  | Lp2(n) | 0.559 | 0.874 | 1.00 | 1.575 |
|  | (Lp1(n)+Lp2(n))/2 | 0.413 | 0.720 | 0.854 | 1.44 |
|  | Wp1(n) | 0.220 | 0.213 | 0.213 | 0.244 |
|  | Wp2(n) | 0.433 | 0.433 | 0.472 | 0.488 |
|  | (Wp1(n)+Wp2(n))/2 | 0.327 | 0.323 | 0.343 | 0.366 |
| OPENING MARK | Lh(n) | 0.488 | 0.740 | 0.850 | 1.409 |
|  | Wh(n) | 0.449 | 0.433 | 0.472 | 0.457 | ns
OPTICAL DISK READ ONLY MEMORY

CROSS REFERENCES TO RELATED APPLICATIONS

The present invention contains subject matter related to Japanese Patent Application JP 2007-319511 filed in the Japanese Patent Office on Dec. 11, 2007, the entire contents of which are incorporated herein by reference.

BACKGROUND OF THE INVENTION

1. Field of the Invention

The present invention relates to an optical disk read only memory. More particularly, the present invention relates to a technique which allows adding unique information, etc., individually to an optical disk read only memory that is mass-produced by pit transfer.

2. Description of the Related Art

In an optical disk read only memory, for example, a ROM (Read Only Memory)-type CD (Compact Disc), DVD (Digital Versatile Disc), BD (Blu-ray Disc: registered trademark), HD-DVD (High Definition DVD), etc., information data of music, video, application programs, and the others is recorded in an area called a content area by a predetermined recording modulation method.

For example, these playback-only optical discs are used by a large number of content holders as content providing means because of the low production cost brought about by the excellent mass-productivity of the discs.

By taking a DVD as an example, a production process of a playback-only optical disc will be described. The production process of a playback-only optical disc roughly includes three processes: a mastering process in which a master of an optical disc is produced using a laser beam; a molding and film-forming process in which a large number of disc substrates are produced using a stamper created from the optical disc master, and a film is formed on each of the disc substrates; and a bonding process in which two optical discs, each of which having a thickness of 0.6 mm to make a pair, are bonded together by adhesive having a predetermined thickness to be a DVD disc medium having a thickness of 1.2 mm.

In the above-described molding and film-forming process, the disc substrates, which are mass-produced using a stamper, are produced by transferring a concave-convex pattern formed on the stamper. That is to say, a recording data string based on pits/lands is formed on a portion to be an information-recording surface as the concave-convex pattern. The recording data string is formed in a spiral or concentric recording track. Then, the information-recording surface, on which pits/lands are formed as a concave-convex pattern, is covered with a metal-alloy reflective film.

After the completion of the disc, laser light emitted from a playback apparatus is reflected by the pits/lands portion. In this regard, a land portion between pits in a pit string is also called a "space".

SUMMARY OF THE INVENTION

A playback-only optical disc is not assumed to contain additional information to be recorded on the disc after the production of the disc. Also, as described above, the information-recording surface is covered with a reflective film, but this reflective film is not considered to be used for a recording film.

However, in recent years, in order to manage playback-only optical discs containing predetermined information data, requests have been made for a method of recording additional information, such as a unique identification number, etc., for each one sheet of the playback-only optical disc to be produced.

However, it has been difficult to record additional information on a playback-only optical disc on which predetermined information data has been already recorded as pits without affecting the information data based on pits after the disc has been processed by the molding and film-forming process. This is because the playback-only optical disc is produced by the above-described production process.

That is to say, it has been difficult to record additional information in an information recording area (a content area, etc.) which already includes information data as pits.

Thus, in the methods, which have been proposed to date, of recording additional information, such as an identification number, etc., onto a playback-only optical disc, it is assumed that additional information is virtually recorded in an area other than the content area. Alternatively, methods are employed of recording additional information, which are different from a recording modulation method of the main signal (the recorded signal by pits/lands transferred from the stamper).

However, playback-only optical discs on which additional information is recorded by these methods are based on the assumption of reading an area other than a content area. For example, the signal output or the modulation method of additional information data is different from the main signal or the modulation method of the main signal, or the like. Thus, the additional information can be read only by a playback apparatus having a special reading function, thereby not allowing to be read by existing playback apparatuses. Accordingly, there has been a problem in that the playback-only optical disc lacks compatibility on that point.

For example, in the BCA (Burst Cutting Area) defined by the DVD-ROM standard, additional information is recorded in an area other than the information recording area using a recording modulation method different from the main signal. Thus, a playback apparatus having a special reading function is necessary.

Also, in Japanese Unexamined Patent Application Publication No. 2001-135021, a description has been given that an area other than the information recording area should be selected for recording additional information.

Also, in International Publication Nos. 01/008145 and 02/101733 brochures, a description has been disclosed that the difference in a reflection factor with the existing information recording area is used. In this case, a playback apparatus having a special reading function is necessary.

In playback-only optical discs, it is desirable to read additionally recorded information on individual discs after disc substrates having the same recording content are produced by the above-described molding and film-forming process without necessitating a special reading device. Moreover, it is also desirable to perform the reading stably and reliably.

According to an embodiment of the present invention, there is provided an optical disk read only memory having an information-recording surface having a concave-convex pattern formed on the basis of a first modulation signal and a reflective film covering the information-recording surface, and including a recording track formed by the concave-convex pattern as a first recording data string including a pit and a land, the optical disk read only memory including: an additional information recording section disposed on the recording layer being planar on the recording track having the first recording data string including the pit and the land; and a second recording data string including a mark of removing or reducing the reflective film in the additional information recording section on the basis of a second modulation signal in the additional information recording section, wherein a modulation method of information data at the time of forming the first recording data string and a modulation method of information data at the time of forming the second recording data string are identical, and $$Lh(n) > Lp1(n) \quad \text{(Expression-1)}$$

and $$Wh(n) > (Wp1(n) + Wp2(n))/2 \quad \text{(Expression-2)}$$

are satisfied;

where a reference clock cycle of the modulated information data is T, an information-data length is nT (n is a natural number), a length of the mark corresponding to nT is Lh(n), a width of the mark corresponding to nT is Wh(n), a length of a base of a truncated cone of the pit corresponding to nT is Lp1(n), a width of the base of the truncated cone of the pit corresponding to nT is Wp1(n), a length of a top surface of the truncated cone of the pit corresponding to nT is Lp2(n) being longer than Lp1(n), and a width of a top surface of the truncated cone of the pit corresponding to nT is Wp2(n) bring longer than Wp1(n).

Also, a plurality of information-recording surfaces may be provided for the information-recording surface as so-called a multi-layer disc, one of the information-recording surfaces may be covered with a total reflective film as the reflective film, and the other of the information-recording surfaces may be covered with a translucent reflective film, the additional information recording section may be disposed at least on the information-recording surface covered with the total reflective film, and relationships of Expression-1 and Expression-2 may be satisfied between the marks and the pits.

Alternatively, the additional information recording section may be disposed at least on the information-recording surface covered with the total reflective film, and relationships of Expression-1 and Expression-2 may be satisfied between the mark and the pit.

In order to produce such an optical disk read only memory of the present invention, for example, in the phase of mass producing disc substrates using a stamper, a section in which pits/lands are not formed is formed in advance as an additional information recording section in the recording track formed by the first recording data string using pits/lands. The information recording surface including such an additional information recording section is covered with a metal-alloy reflective film. After that, additional information is recorded as a second recording data string by forming a mark (in the following an opening mark) in which a partial area of the metal-alloy reflective film is removed or reduced in the additional information recording section.

That is to say, the additional information is recorded in a partial area of the recording track in the information recording area (an area in which information is recorded as the first recording data string based on pits/lands, and which includes a management area, such as a content area, a lead-in, etc.).

In this regard, various kinds of information is assumed to be the additional information to be recorded as the second recording data string having opening marks. For example, a unique identification number, etc., may be individually recorded on each one sheet of the playback-only optical discs. Alternatively, a part of the main data stored on the playback-only optical disc, etc., may be recorded.

Here, when the first recording data string (in the following, also called a pre-pit signal string) by pits/lands and the second recording data string (in the following, also called an opening-mark signal string) by opening marks are formed in this manner, it is requested that both playback signals of the pre-pit signal string and the opening-mark signal string are read stably.

The pre-pit signal read from the pre-pit signal string is played back on the basis of "phase-difference detection".

The phase of reflected light is different depending on whether the light is reflected from a pit section or a land section, and thus when a pit enters into a spot of playback laser light, the amount of reflected light decreases by the interference of light from the pit section and the land section. In the pre-pit signal, the depth of a pit relates to a phase difference, and a pit position and the occupied area of a pit in a playback light spot relates to the ratio of the amount of light between a pit section and a land section in the playback light spot. Interference of light occurs to weaken each light most when there is a phase difference of 180 degrees, and further, if there is the same amount of light, the result of interference becomes substantially zero, thereby obtaining a large signal amplification degree. Thus, the signal modulation degree of the pre-set signal is greatly influenced by the depth and the area of a pit.

On the other hand, the opening-mark signal read from the opening-mark signal string is played back on the basis of "reflection-factor difference detection". This is because the reflection factor from a land section is invariant, whereas since the reflection factor from an opening-mark section changes to substantially zero, when an opening mark enters into a playback light spot, the reflected light decreases.

Accordingly, in an opening-mark signal string, a position and the occupied area of an opening mark in a playback light spot relates to the amount of reflected light, thereby if the area becomes the larger compared to the playback light spot, the smaller the amount of reflected light becomes to obtain a large degree of modulation. Thus, the degree of signal modulation of an opening-mark signal is greatly influenced by the area of the opening mark.

At the time of detecting a playback signal of an optical disk read only memory, when a signal from a photodetector is input into a waveform equalizer to be processed, if the individual input levels of the pre-pit signal and the opening-mark signal are different, a waveform distortion arises at the switching section of both of the output signals, and thus the detection of the playback signal becomes unstable. It is therefore desirable to make the signal level (modulation degree) of both of the signals substantially equal in order to detect the signals stably.

Thus, in the present invention, the individual input levels of the pre-pit signal and the opening-mark signal are made substantially equal by defining the size of the pit and the size of the opening mark. That is to say, the above-described relationships of Expression-1 and Expression-2 are derived in consideration of the difference in a detection method, namely, phase-difference detection and reflection-factor difference detection, and the difference in the shape of a pit and an opening mark.

By the present invention, additional information data is recorded in a partial area of the recording track in the information recording area as the second recording data string based on opening marks. Also, the second recording data string based on opening marks and the first recording data string based on pits/lands are formed on the basis of the modulation signal modulated by a same modulation method on the information data to be recorded.

In the case of the present invention, relative relationships in size on the length and the width of a pit and those of an opening mark, which determine areas of the pit and the mark, are defined as the above-described Expression-1 and Expression-2.

Thus, the degree of modulation of the pre-pit signal and the opening mark signal can be made equal. As a result, both of the input digital levels are made substantially equal. Thereby, there are advantages in that it is not necessary to have a special reading apparatus and both of the signals can be stably read.

BRIEF DESCRIPTION OF THE DRAWINGS

FIG. 1 is an explanatory diagram of a disc production process according to an embodiment of the present invention;

FIG. 2 is a plan view of a playback-only optical disc according to the embodiment;

FIG. 7A is a schematic sectional view of a two-layer playback-only optical disc according to the embodiment;

FIG. 7B is a schematic sectional view of the two-layer playback-only optical disc according to the embodiment;

FIG. 15 is an explanatory diagram for measurement values on an example of an experiment of the optical disk read only memory according to the embodiment.

DESCRIPTION OF THE PREFERRED EMBODIMENTS

Figure 3A:
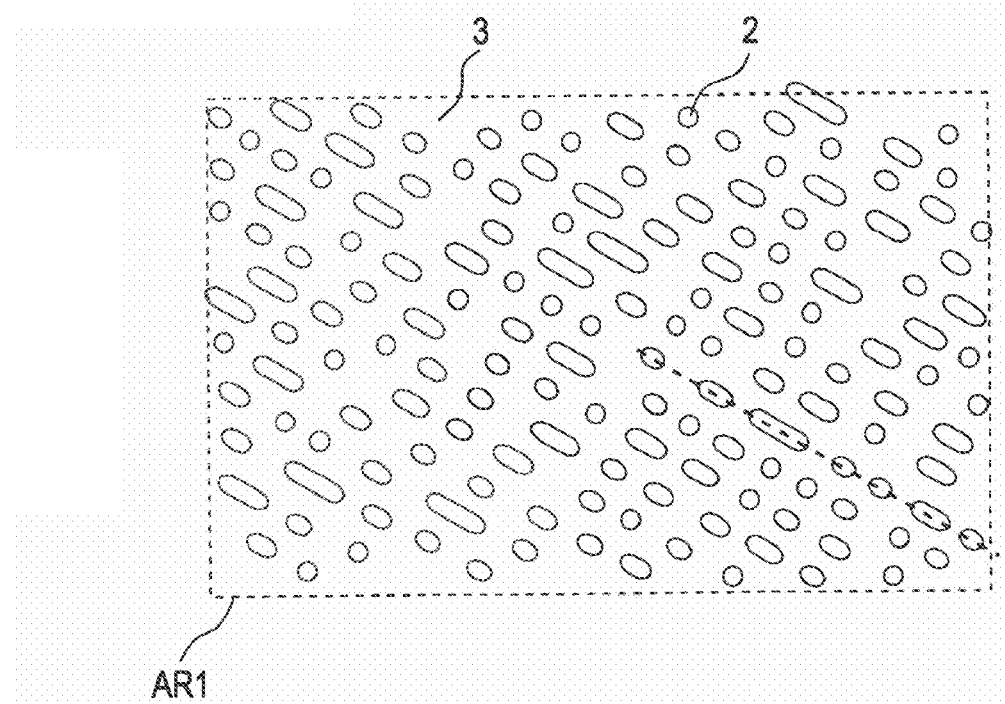
FIG. 3A is a partly enlarged view of a playback-only optical disc according to the embodiment.

In the following, a description will be given of an embodiment of the present invention. In the embodiment, a description will be given of an optical disk read only memory of the present invention by taking a DVD playback-only optical disc as an example.

First, a production process of a playback-only optical disc 90 according to the embodiment will be described with reference to FIG. 1.

FIG. 1 is an explanatory diagram of a production process of a playback-only optical disc as a DVD according to an embodiment of the present invention. The disc production process of the embodiment roughly includes four processes: a mastering process in which a master of an optical disc is produced using a laser beam; a molding and film-forming process in which a large number of disc substrates are produced using a stamper created from the optical disc master and a film is formed on the disc substrates; a bonding process in which two optical discs, each of which having a thickness of 0.6 mm to make a pair, are bonded together by adhesive having a predetermined thickness to be an optical disc having a thickness of 1.2 mm; and an additional recording process in which additional information, for example, identification information, etc., is recorded onto the individual bonded optical discs.

Each process will be described.

The mastering process is a process in which an optical disc master 92 is produced on the basis of the information data recorded on a master disc 91. In this process, a mastering apparatus having a recording-modulation-signal generation section 100 and a laser-beam recorder 110 is used.

The recording-modulation-signal generation section 100 plays back the master disc 91, reads the information data to be recorded, perform EFM+ (Eight to Fourteen Modulation plus), and outputs the generated EFM+ signal to the laser-beam recorder 110.

The optical disc master 92 is produced by applying photo resist, which is a photosensitive material, on a glass plate. The thickness of the applied photo resist corresponds to the depth of pits. Thus, the thickness of the applied photo resist should be changed in order to change the depth of pits. The laser-beam recorder 110 emits laser light on the optical disc master 92 in accordance with the supplied EFM+ signal, and performs exposure of a pit pattern on the basis of the EFM+ signal. The width and the length of a pit can be adjusted by the laser beam strength at the time of the exposure and the exposure time period. After that, the photo-resist film is subjected to development processing. In the case of positive-type photo resist, the exposed portion is melted to form a concave-convex pattern on the photo-resist film. Thus, a pit pattern (a concave-convex pattern of pits/lands) in accordance with a predetermined format is formed on the surface of the optical disc master 92.

A description will be given later of a pit with reference to FIG. 11. A pit is formed to be a truncated cone in shape. At the phase of the optical disc master 92, a pit formed on the optical disc master 92 has a smaller area at the side of a glass plate, and a larger area at the side of the exposure surface of the photo resist.

In this regard, as described above, the recording-modulation-signal generation section 100 generates the EFM+ signal on the basis of the signal read from the master disc 91. The recording-modulation-signal generation section 100 inserts a non-modulation signal during a specific period in part of the EFM+ signal on the basis of an instruction from an additional recording management section 160.

In the timing period of the non-modulation signal, the laser-beam recorder 110 turns off laser light. That is to say, by inserting a non-modulation signal in the EFM+ signal, an unexposed section is formed on the optical disc master 92. A land occupies all of this section, and a concave-convex pattern is not formed in the section. This section becomes an additional-information recording section described below.

A mold called a stamper 93, to which the pit pattern of the optical disc master 92 is reversal-transferred, is produced on the basis of the optical disc master 92 like this. The additional information recording section is formed on the stamper 93 as a matter of course.

Next, in the molding and film-forming process, first, an optical disc substrate 94 is produced by the molding apparatus 120 using the stamper 93. The concave-convex pattern formed on the optical disc master 92 is transferred onto the optical disc substrate 94 to form a pit pattern.

For the production method of the optical disc substrate 94, compression molding, injection molding, photo curing, etc., are applicable.

The optical disc substrate 94, on which a pit pattern has been transferred from the stamper 93, is coated with a coating film, such as a reflective film, etc., by the film-forming apparatus 130 subsequently, and thus a reflective-film-formed optical disc substrate 95 is formed.

Next, in the bonding process, the above-described reflective-film-formed optical disc substrate 95 and a mating substrate 96 are bonded.

The mating substrate 96 employs a reflective-film formed optical disc substrate produced in the same process as described above, a translucent-film formed optical disc substrate, or a dummy optical disc substrate on which a reflective-film is not coated.

A substrate bonding apparatus 140 bonds the reflective-film-formed optical disc substrate 95 with one of the above-described mating substrates 96 to produce a bonded optical disc 97.

For a method of bonding, a method using ultraviolet curing resin, a method using adhesive attachment sheet, etc., are applicable.

In a related-art DVD, the above-described bonded optical disc 97 becomes a finished product. However, in the case of the present embodiment, as described above, an additional-information recording section on which a pit pattern is not formed is disposed in a partial section of the recording track on which a pit pattern has been formed.

Thus, the bonded optical disc 97 is subjected to an additional recording process. In the additional recording process, an additional-information recording apparatus 150 writes additional information in the above-described additional-information recording section of the bonded optical disc 97. For example, the additional-information recording apparatus 150 writes identification information different for each individual optical disc, etc., as the additional information.

The additional-information recording apparatus 150 writes additional information by receiving an instruction of position information (address) of the additional recording section and the additional information to be written from an additional recording management section 160.

In this case, the additional-information recording apparatus 150 performs EFM+ modulation on the additional information, emits high-output laser pulses for recording on the basis of the EFM+ signal, and removes or reduces the reflective film in the additional-information recording section. Thereby, the additional-information recording apparatus 150 writes the information by forming opening marks. The width or the length of an opening can be adjusted by changing the output of the recording laser and the emission time.

By completing such an additional recording process, the production of the playback-only optical disc 90 is completed. The playback-only optical discs 90 mass-produced by the above processes are optical discs on which the same content (music, video, a game, an application program, etc.) is recorded, and at the same time, are optical discs on which unique additional information is recorded individually.

A description will be given of a playback-only optical disc 90 (DVD) of the present embodiment, which is produced as described above.

FIG. 2 is a plan view of the playback-only optical disc 90. The playback-only optical disc 90 is a disc having a diameter of 12 cm. The area within a radius shown by an arrow is an information recording area 1. The information recording area 1 is an area in which a recording data string by pits/lands based on the EFM+ signal is formed as a recording track in a spiral form, for example. The area includes a lead-in area in which management information is recording, a content area in which content data is recorded, a lead-out area, etc.

Figure 3B:
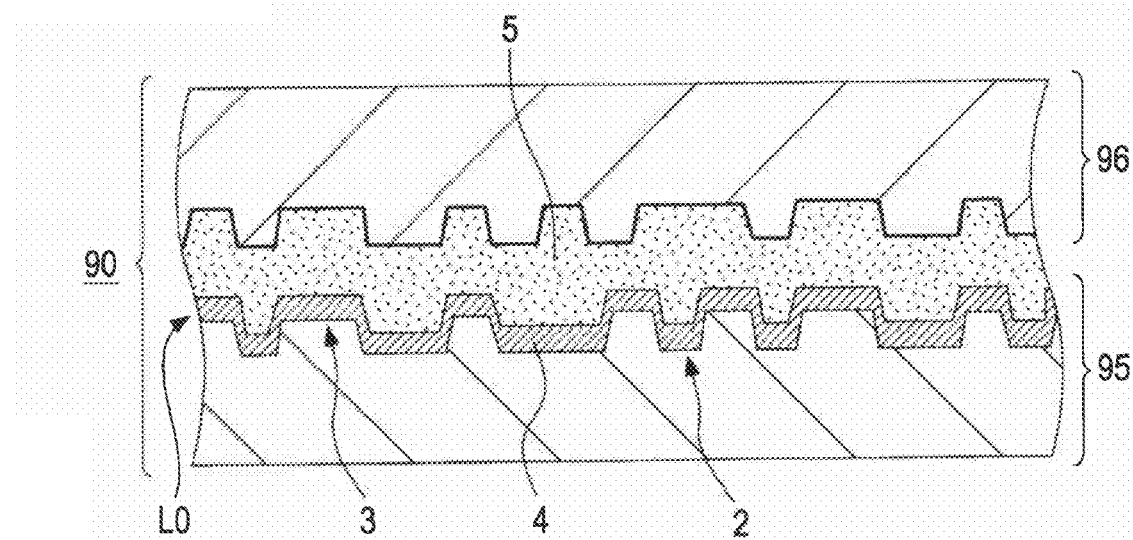
FIG. 3B is a schematic sectional view of the playback-only optical disc according to the embodiment.
Figure 4A:
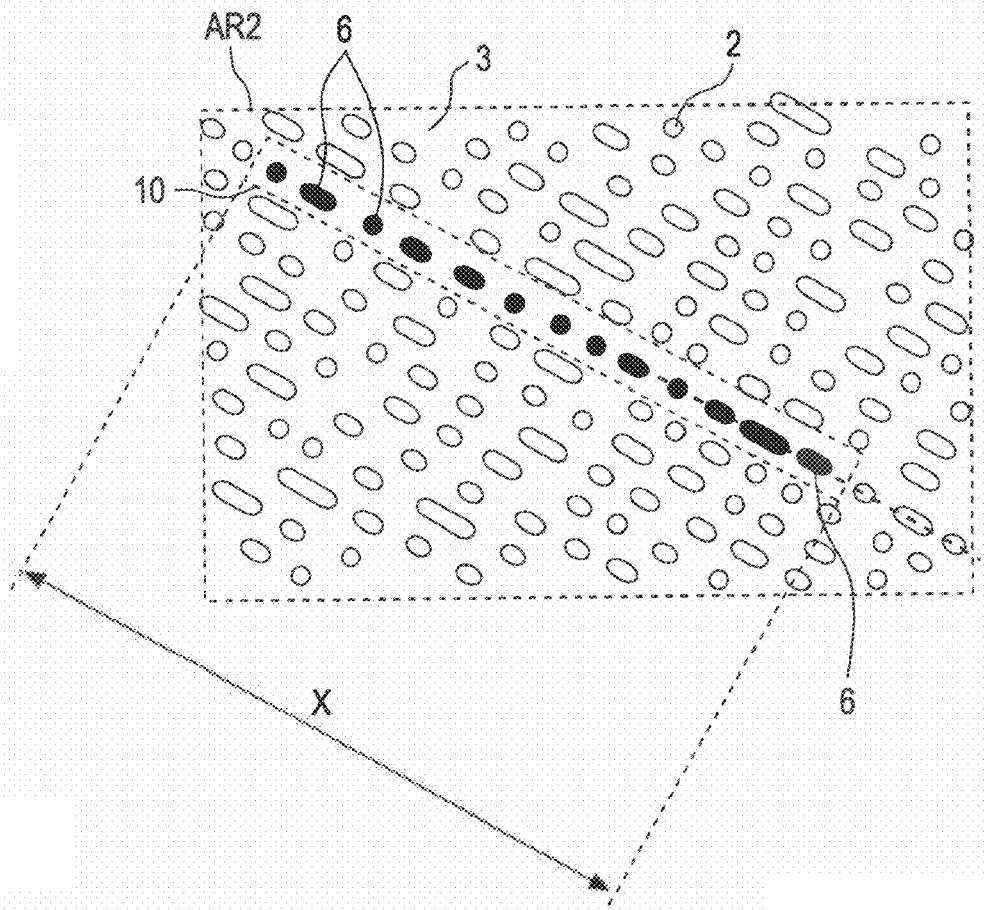
FIG. 4A is a partly enlarged view of the playback-only optical disc according to the embodiment.
Figure 4B:
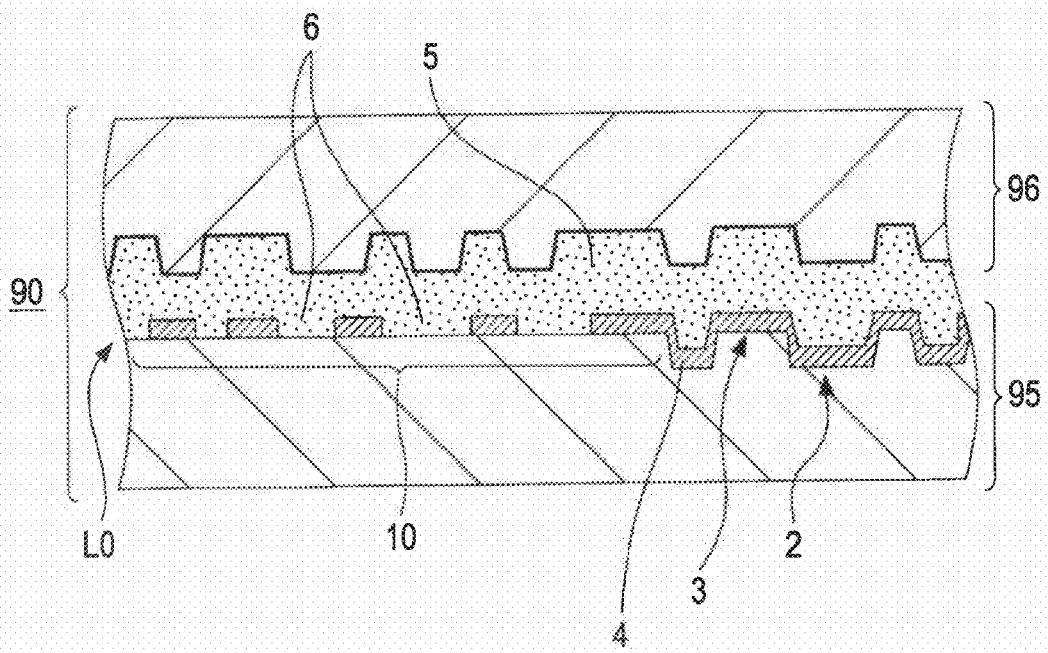
FIG. 4B is a schematic sectional view of the playback-only optical disc according to the embodiment.

In the information recording area 1, an enlarged view and a schematic sectional view of parts shown in ranges AR1 and AR2 in FIG. 2 are shown in FIGS. 3A and 3B, and in FIGS. 4A and 4B, respectively.

Here, the range AR1 is a portion in which a recording track is produced as a recording data string by normal pits/lands. The range AR2 is a portion including an additional-information recording section in which opening pits are formed.

FIG. 3A illustrates an enlarged view of the range AR1, and FIG. 3B illustrates a schematic sectional view of a dotted-line portion of FIG. 3A.

FIG. 3A illustrates a state in which a pattern is formed as a recording data string by pits 2 and lands 3.

As is understood from FIG. 3B, the playback-only optical disc 90 is produced by bonding the reflective-film-formed optical disc substrate 95 and the mating substrate 96, each of which is a polycarbonate disc having a thickness of 0.6 mm, with adhesive 5 (for example, ultraviolet curing resin or adhesive attachment sheet) to have a thickness of 1.2 mm.

In this case, one main surface of the reflective-film-formed optical disc substrate 95 is an information-recording surface L0, and the information-recording surface L0 is formed as a concave-convex pattern by pits 2 and lands 3. Also, a reflective film 4 is formed on the surface of the pits 2 and the lands 3.

In this regard, the pits 2 and the lands 3 may have the opposite concave-convex relationship.

The mating substrate 96, with which the reflective-film-formed optical disc substrate 95 is bonded, is assumed to be a dummy optical disc substrate (disc substrate on which a reflective film is not coated) in FIG. 3B. However, as described above, for a mating substrate 96, a reflective-film formed optical disc substrate or a translucent-film formed optical disc substrate may be used.

In general, the adhesive 5 is light transmissive, but may not be light transmissive depending on the structure. If the reflective-film-formed optical disc substrate 95 and the mating substrate 96 have a reflective film or a translucent reflective film, the bonding surface is a surface on which a reflective film or a translucent reflective film is formed.

Next, FIG. 4A illustrates an enlarged view of the range AR2 in FIG. 2, and FIG. 4B illustrates a schematic sectional view of a dotted-line portion in FIG. 4A.

As shown in FIG. 4A, a partial section of a certain one-circuit track is assumed to be an additional-information recording section 10. In the additional-information recording section 10, a recording data string is formed by an opening marks 6 formed by the above-described additional recording processing. That is to say, additional information is recorded as a recording data string by opening marks 6. The preceding part and the succeeding part in the track direction of the additional-information recording section 10 are recording data strings by pits 2 and lands 3, and the tracks adjacent to the additional-information recording section 10 are also recording data strings by pits 2 and lands 3.

As shown in FIG. 4B, the basic layer structure of the range AR2 becomes the same as that shown in FIG. 3B, but opening marks 6 are formed on part of the information recording surface L0. That is to say, the opening marks 6 are formed by removing or reducing the metal-alloy reflective film 4 so that the film is almost non-existent.

Figure 5A:
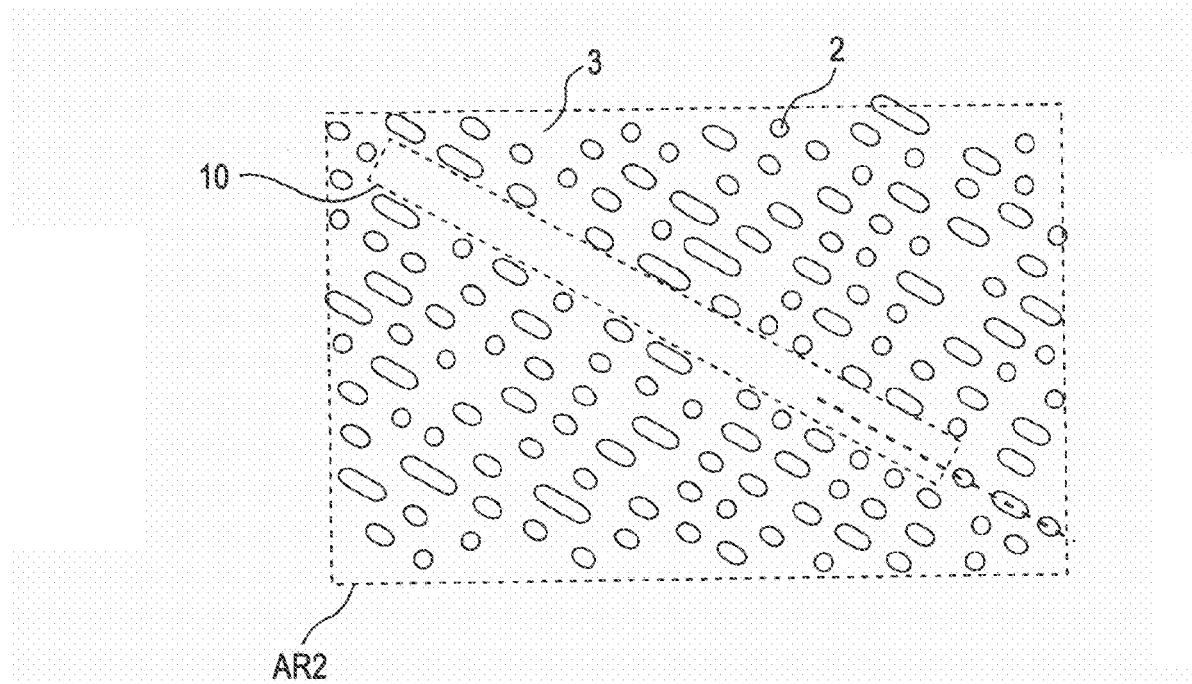
FIG. 5A is a partly enlarged view of the playback-only optical disc, before additional information is recorded, according to the embodiment.
Figure 5B:
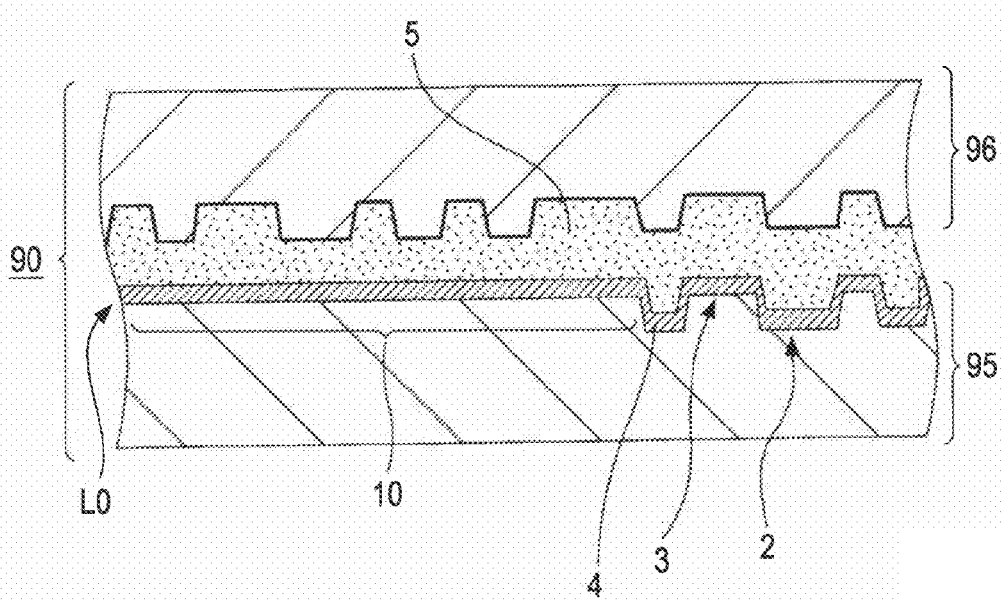
FIG. 5B is a schematic sectional view of the playback-only optical disc, before additional information is recorded, according to the embodiment.

FIGS. 5A and 5B show a state before additional information is recorded in the above-described additional recording process in a corresponding relationship with FIGS. 4A and 4B, respectively.

As shown in FIG. 5A, the additional-information recording section 10 is a section on which a concave-convex pattern based on pits 2 and lands 3 is not formed as non-modulation section. As is understood from FIG. 5B, the additional-information recording section 10 is in the same plane with the land 3, a reflective film 4 is coated thereon to become a so-called a mirror section.

Additional information is recorded on the additional-information recording section 10 like this in the additional recording process.

That is to say, the above-described additional-information recording apparatus 150 is provided as a dedicated recording apparatus using, for example, high-output red semiconductor laser. The additional-information recording apparatus 150 has a function of tracking a pit string of the information recording area 1 using, for example, DPD (differential phase detection), and a function of emitting high-output recording laser pulses in a desired section. The additional-information recording apparatus 150 records information on the additional-information recording section 10 in a state of FIGS. 5A and 5B to form opening marks 6 as shown in FIGS. 4A and 4B. The modulation of the emission pattern at that time employs the EFM+ signal as the same modulation method as the modulation corresponding to a pit string in the information recording area.

Figure 6:
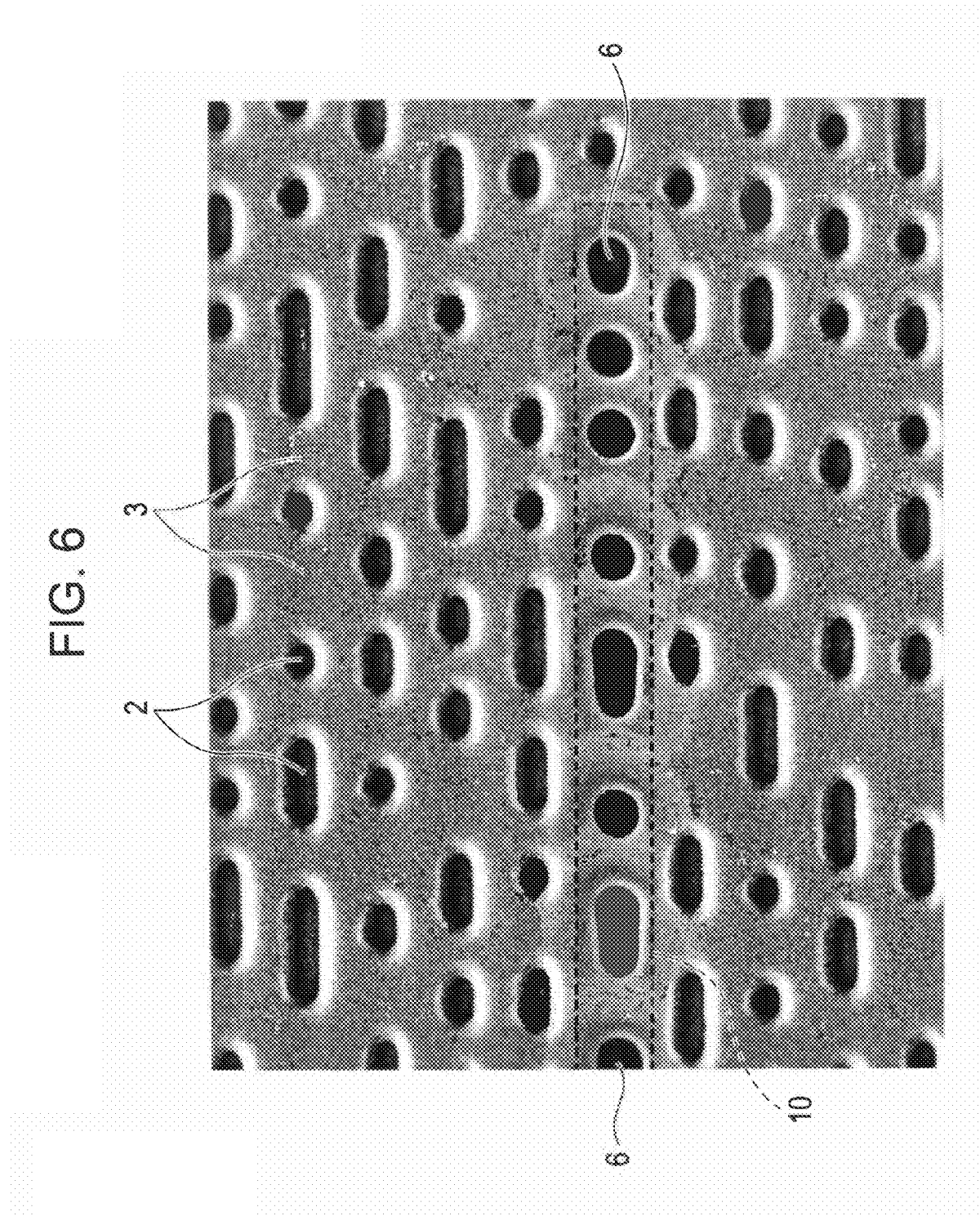
FIG. 6 is an explanatory diagram, using a SEM photograph, of an additional information recording section of the playback-only optical disc according to the embodiment.

FIG. 6 shows a state of a sample in which opening marks 6 are formed by entering high-output laser on the additional-information recording section 10 on the playback-only optical disc 90 as recording of additional information. This is an observation photograph, taken by an SEM (Scanning Electron Microscope), of the additional-information recording section 10, on which opening marks 6 are formed.

At the time of the SEM observation, the reflective-film-formed optical disc substrate 95 and the mating substrate 96 (dummy optical disc) are separated at the adhesive surface, and an observation was made on the portion from which the reflective film 4 is stripped off by entering an electron beam. For the reflective film 4, an Al alloy, which is an Al-based alloy including about 1 atom percent of Fe and about 5 atom percent of Ti, was used.

As is understood from FIG. 6, the metal-alloy reflective film formed on the additional-information recording section 10 is removed or reduced in accordance with the modulation signal of the additional information to make openings in an oval form. Thus, the opening marks 6 corresponding to pits are finely formed.

In the above FIGS. 3A to 5B, a description has been given of the case of a single layer disc, which is provided with one information recording surface L0 as the information recording surface. However, in the case of a multi-layer disc, which is provided with a plurality of information recording surfaces, it is also possible to form a recording data string by opening marks 6 as described above. FIGS. 7A and 7B show an example of the sectional structure.

FIGS. 7A and 7B show a playback-only optical disc 90 on which two information recording surfaces L0 and L1 are formed individually, and in particular, show a sectional structure of the portion in which the additional-information recording section 10 is disposed.

In the case of the playback-only optical disc 90 having a two-layer structure, against the reflective-film-formed optical disc substrate 95, a translucent-reflective-film-formed optical disc substrate is used for a mating substrate 96. The translucent-reflective-film-formed optical disc substrate is an optical disc substrate produced by forming a translucent reflective film 7 on a disc substrate on which a predetermined recording data string based on pits/lands is formed.

The information recording surface L0 is formed on one main surface of the reflective-film-formed optical disc substrate 95, and the information recording surface L1 is formed on one main surface of the translucent-reflective-film-formed optical disc substrate.

The information recording surfaces L0 and L1 can be formed by an applicable method. For example, two optical disc substrates 94 are molded at the same time. Simultaneously with molding, pits 2 and lands 3 forming the first information recording surface L0 are molded on one main surface of one of the optical disc substrates 94. Pits 2 and lands 3 forming the second information recording surface L1 are molded on one main surface of the other of the optical disc substrates 94.

Next, a reflective film 4 and a translucent reflective film 7 are formed on the surface of the information recording surface L0 of one of the optical disc substrates 94 and on the surface of the information recording surface L1 of the other of the optical disc substrates 94, respectively, by sputtering, for example.

Next, for example, ultraviolet curing resin is applied on the information recording surface L0 of one of the optical disc substrates 94, and the information recording surface L0 is adhered to the information recording surface L1 of the other of the optical disc substrates 94. The ultraviolet curing resin is cured by emitting ultraviolet light.

In the case of two or more information recording surfaces, it is possible to form opening marks 6 in the same manner as described above. That is to say, the additional-information recording apparatus 150 focuses recording laser on the information recording surface of the side on which the additional-information recording section 10 is formed as non-modulation section, and emits laser light at appropriate output in accordance with the modulation signal of the additional information, thereby forming opening marks 6.

FIG. 7A is an example in which the additional-information recording section 10 is disposed at the side of the information recording surface L0, and opening marks 6 are formed by emitting laser to remove or reduce the reflective film 4 (total reflective film).

Also, FIG. 7B is an example in which the additional-information recording section 10 is disposed at the side of the information recording surface L1, and opening marks 6 are formed by emitting laser to remove or reduce the translucent reflective film 7.

In this regard, at this time, the direction of recording laser emission is not limited. However, for example, when the laser incident direction is set as shown in FIG. 7A, and opening marks 6 are formed on the side of the information recording surface L0, the effective laser output focused on the information recording surfaces L0 is attenuated by the translucent reflective film 7. Thus, it is necessary to set the laser output at emission time to a large amount in consideration of the amount of attenuation.

As the example in FIG. 7, for the playback-only optical disc 90 having a multi-layer structure, it is possible to dispose the additional-information recording section 10 on either of the information recording surfaces, and to write additional information on the additional-information recording section 10 as a data string by opening marks 6.

In this regard, a description has been given here that additional information is written onto either of the information recording surfaces. However, the additional-information recording section 10 may be disposed on both of the information recording surfaces L0 and L1, and the additional-information recording sections 10 may be individually formed as recording data strings by opening marks 6.

Here, in order to allow the playback-only optical disc 90 of the present embodiment to be used for a DVD, it is necessary for the disc to be made to conform to a DVD standard as a matter of course. That is to say, it is necessary that the portion, on which a recording data string by openings 6 are formed, conforms to the DVD standard.

Thus, it is necessary for a recording data string section by opening marks 6 to satisfy at least the following conditions:

A recording data string by opening marks 6 satisfies the run length limit.

The reflection factor of a recording data string by opening marks 6 conforms to a DVD standard.

The modulation degree of a playback signal of a recording data string portion by opening marks 6 conforms to a DVD standard.

The asymmetry of a playback signal of a recording data string portion by opening marks 6 conforms to a DVD standard.

The jitter value of a recording data string portion by opening marks 6 conforms to a DVD standard.

First, the fact that a recording data string by opening marks 6 satisfies the run length limit means that it is necessary to have a pattern of opening marks 6 and lands of 3T to 14T (T is a reference clock cycle of the information data modulated at recording time). For this purpose, additional information should be modulated to an EFM+ signal in the same manner as the case of forming a usual recording data string by pits/lands, opening marks 6 are formed on the basis of the EFM+ signal, and relationships between an additional information recording section and the preceding/succeeding pit strings should satisfy the run length limit.

Also, in DVD standards, the reflection factor should be not less than 60% and not greater than 85% (in the case of non-polarization optical system), or should be not less than 45% and not greater than 85% (in the case of polarization optical system). In the case of a two-layer disc, the reflection factor should be not less than 18% and not greater than 30%.

Figure 8:
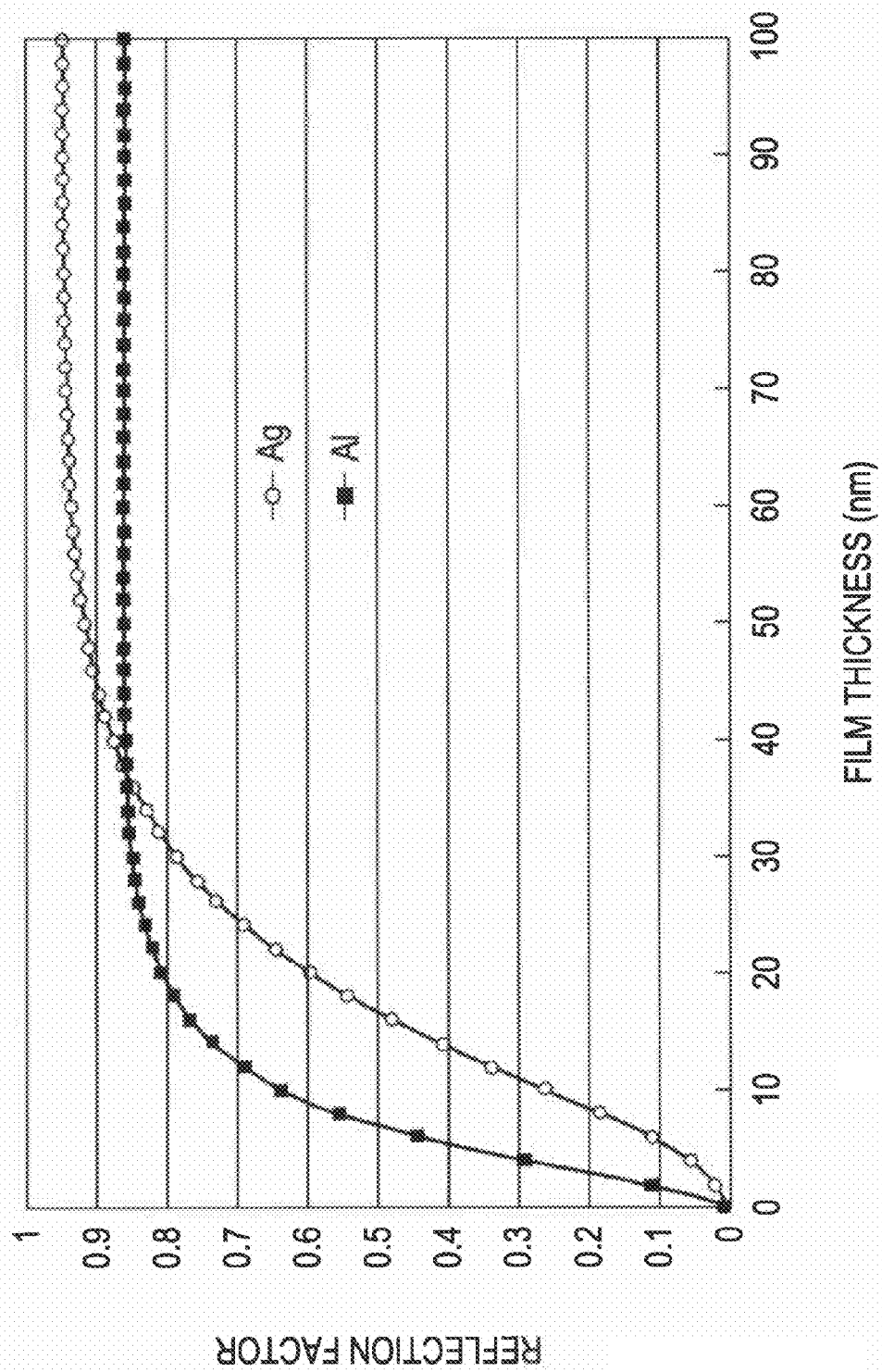
FIG. 8 is an explanatory diagram of relationships between a film thickness of a reflective film and a reflection factor according to the embodiment.

FIG. 8 shows a relationship between a reflection factor and a film thickness of opening-mark 6 section. Here, the relationships are shown in the case where pure Ag and pure Al are employed as a reflective film, and the refraction factors are calculated by a computer when light having a wavelength of 650 nm is individually emitted through resin having a refraction factor of about 1.5. FIG. 8 shows that the thinner the film, the lower the reflection factor becomes. When the reflective film is pure Ag, the reflection factor becomes about 80% at a film thickness of 30 nm, and the reflection factor becomes over 90% to level off at a film thickness of 50 nm or more. Also, when the reflective film is pure Al, the reflection factor becomes about 70% at a film thickness of 10 nm, and the reflection factor becomes over 85% at a film thickness of 20 nm to level off at a film thickness of 35 nm or more.

In the present embodiment, in order to stably form opening marks 6 of additional information data, for example, an Al alloy produced by alloying elements to pure Al is used for a reflective film. The reflection factor decreases in the case of an Al alloy than the case of pure Al when compared with having a same film thickness. Thus, the composition and the film thickness of the Al alloy should be controlled such that the reflection factor at the time of leveling off of the reflective film material satisfies the above-described DVD standard, for example, the reflection factor becomes 60% or more in the case of non-polarization optical system.

Here, the portion of opening mark 6 is a portion formed by removing or reducing the reflective film, and the space portion (land portion) between the opening marks 6 is a portion where the reflective film remains normal. Basically, the space portion between the opening marks 6 has a same film thickness as the portion of the land 3 of the recording data string by pits 2 and lands 3, and thus a necessary reflection factor is obtained.

For the modulation degree, the DVD standard defines as follows:

$$I14/I14H \geq 0.60$$

$$I3/I14 \geq 0.15 \text{ (in the case of a single-layer disc)}$$

$$I3/I14 \geq 0.20 \text{ (in the case of a two-layer disc)}.$$

Also, for the asymmetry, the DVD standard defines as follows:

$$-0.05 \leq \{(I14H+I14L)/2-(I3H+I3L)/2\}/I14 \leq 0.15.$$

Figure 9:
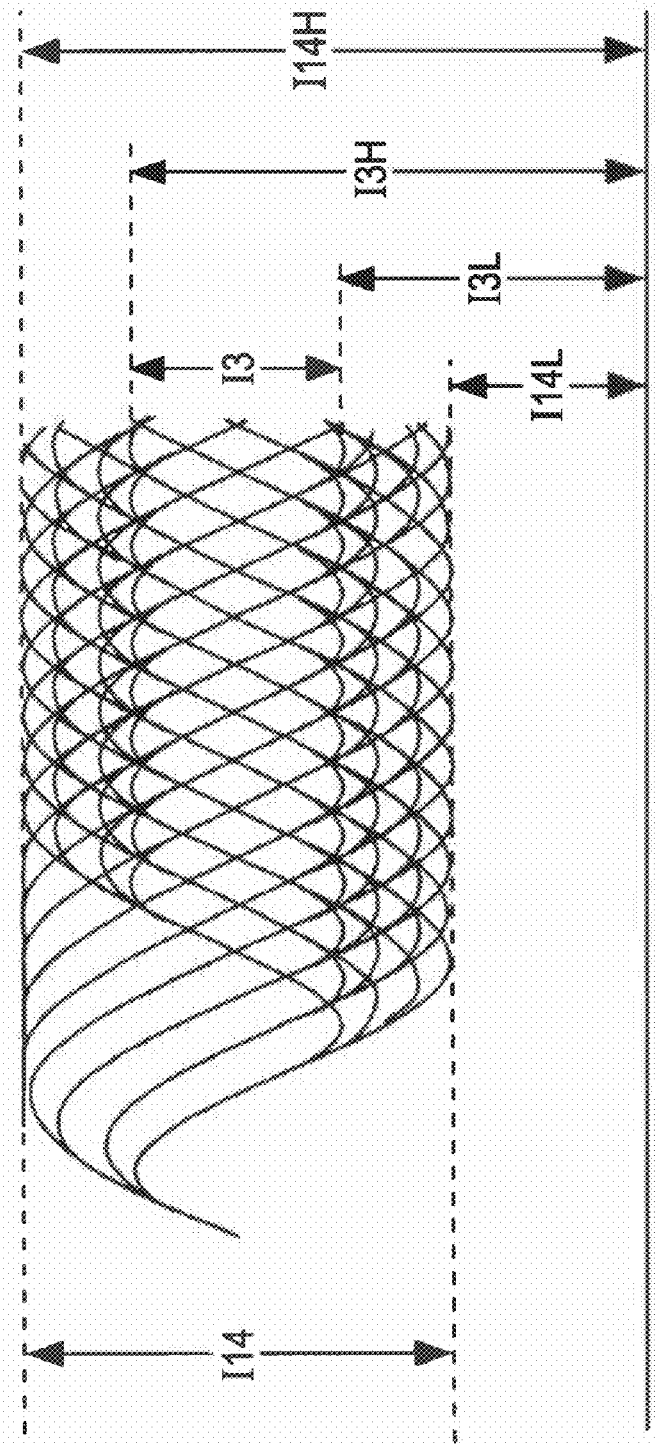
FIG. 9 is an explanatory diagram of an eye pattern of a playback signal.

FIG. 9 shows a schematic diagram of an eye pattern of a playback signal. In the above expressions, I14 denotes an amplitude level between a peak and a bottom of the 14T pattern, I14H denotes a peak level of the 14T pattern, I14L denotes a bottom level of the 14T pattern, I3 denotes an amplitude level between a peak and a bottom of the 3T pattern, I3H denotes a peak level of the 3T pattern, and I3L denotes a bottom level of the 3T pattern.

Figure 10:
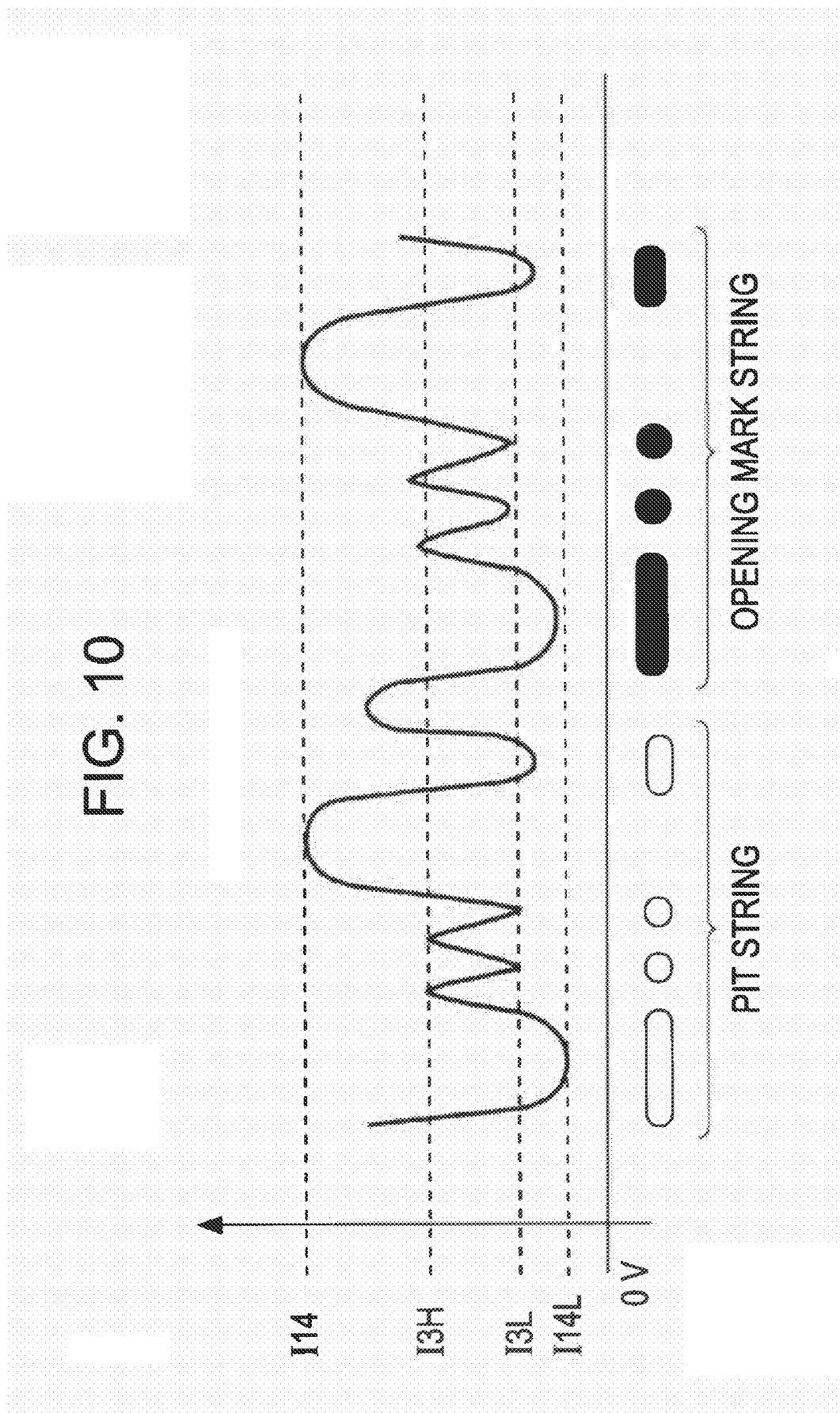
FIG. 10 is an explanatory diagram of a playback-signal waveform according to the embodiment.

FIG. 10 schematically shows the amplitude of a playback signal from a recording data string by pits 2 and lands 3 and the amplitude of a playback signal from opening marks 6 according to the present embodiment. As shown in FIG. 10, substantially same levels can be obtained as I14H, I14L, I3H, and I3L both from the recording data string by pits 2 and lands 3 and from the recording data string by opening marks 6, and thus the standards of the modulation degree and the asymmetry can be satisfied.

For the jitter value (with respect to channel bit clock time), the recording data string by opening marks 6 should be formed so that the jitter value is not greater than 8.0%.

As is already publicly known, on a recording data string based on pits/lands, information based on pits/lands is detected by a change in the strength of the reflected light caused by a phase difference. That is to say, the amount of reflected light decreases at a pit 2 by a relationship between the interference caused by a phase difference of diffracted light and an aperture of the objective lens of an playback apparatus. Thereby, a difference in the amount of reflected light is obtained between a land 3 and a pit 2. Thus, a playback signal waveform in accordance with pits/lands is obtained.

On the other hand, on a recording data string based on opening marks 6, a difference in the amount of reflected light detected because of a difference in reflection factor is obtained between an opening mark 6 and a space portion. As is understood from FIG. 8, the reflection factor becomes low at an opening mark portion 6 where the reflective film is substantially removed, whereas the reflection factor becomes high at a space portion where the reflective film remains.

As a result, as shown in FIG. 10, a substantially same playback signal waveform is obtained from a recording data string based on a pit string and that based on opening marks 6. Thus, a same logicality is obtained from opening marks 6 as that from pits 2.

Here, a description will be given of the condition enabling a substantially same level to be obtained as I14H, I14L, I3H, and I3L both from a pre-pit signal string and from an opening-mark signal string. That is to say, a description will be given of the condition which enables a substantially same modulation degree and asymmetry to be obtained from a pre-pit signal read from a pre-pit signal string and an opening-mark signal read from an opening-mark signal string, and which enables both signals to be stably read.

Figure 11A:
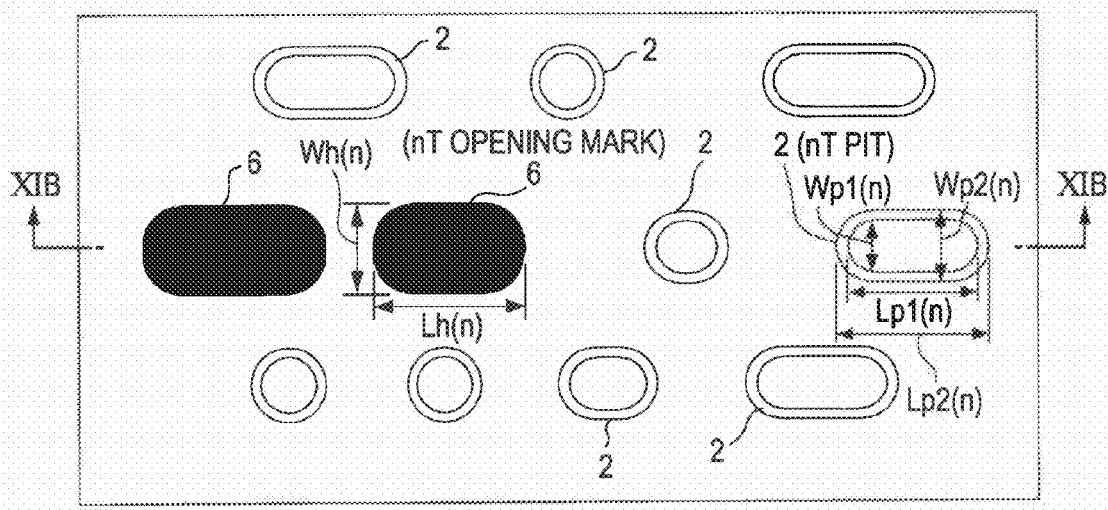
FIG. 11A is a top view of pits and opening marks according to the embodiment.

FIG. 11A illustrates a top view of pits 2 and opening marks 6. Also, FIG. 11B illustrates a sectional view taken on line XIB-XIB in FIG. 11A.

Figure 11B:
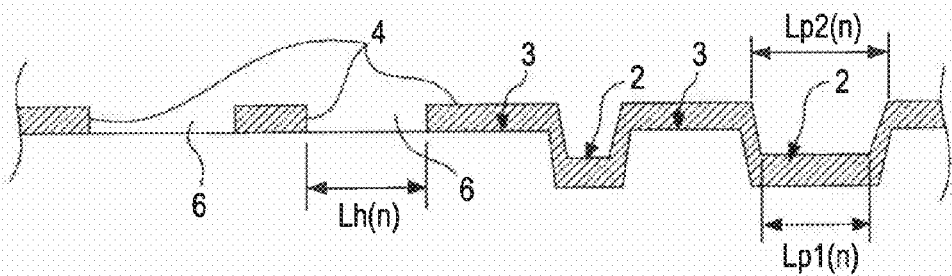
FIG. 11B is a sectional view of pits and opening marks according to the embodiment.

As is understood from FIGS. 11A and 11B, a pit 2 is a concave portion, which is a truncated cone in shape.

It is assumed that $Lp1(n)$ and $Wp1(n)$ are a length and a width, respectively, of a base (a base of the truncated cone) corresponding to nT and having a smaller pit area for the pit 2.

Also, it is assumed that $Lp2(n)$ and $Wp2(n)$ are a length and a width, respectively, of a base (a top surface of the truncated cone) having a larger area of the pit 2.

In this case, the following relationships obviously hold:

$Lp1(n)<Lp2(n)$, and $Wp1(n)<Wp2(n)$

Also, for an opening mark 6, it is assumed that $Lh(n)$ and $Wh(n)$ are a length and a width, respectively, of an opening mark corresponding to nT.

In conclusion, for the sizes of an opening mark 6 and a pit 2, both of the following expressions should be satisfied:

$Lh(n)>Lp1(n)$ (Expression-1)

$Wh(n)>(Wp1(n)+Wp2(n))/2$ (Expression-2).

That is to say, the length $Lh(n)$ of the opening mark 6 of nT is determined to be longer than the length $Lp1(n)$ of the base of a truncated cone of the pit 2 of nT.

Also, the width $Wh(n)$ of the opening mark 6 of nT is determined to be longer than an intermediate size between the width $Wp1(n)$ of the base of the truncated cone of the pit 2 of nT and the width $Wp2(n)$ of the top surface of the truncated cone.

By setting the sizes of a pit 2 and an opening mark 6 like this, it is possible to obtain a substantially same amplitude as shown in FIG. 10 from a pre-pit signal string and an opening-mark signal string. Thus, it is possible to make the modulation degree and the asymmetry substantially equal.

How to set the size of a pit 2 is already understood. It is possible to set the size by the strength of a laser beam and the emission time (exposure time) at the time of master exposure.

It becomes possible to adjust the width and the length of a pit by adjusting the strength of a laser beam.

Also, it is possible to fine adjust the length of a pit by the emission time (exposure time) of a laser beam at the time of master exposure. The length of a pit itself is defined, for example, from 3T to 14T, and the emission time of laser is set corresponding to individual T. However, it is possible to make the pit length of individual T a little longer or shorter by fine adjusting the emission time of laser of the individual T.

It is also possible to adjust the size of an opening mark 6 by changing the output and the emission time of the recording laser of the additional-information recording apparatus 150.

FIGS. 12A, 12B, 13A, and 13B are relationships of the recording laser power for forming an opening mark 6 and the width and the length of the opening mark 6.

Figure 12A:
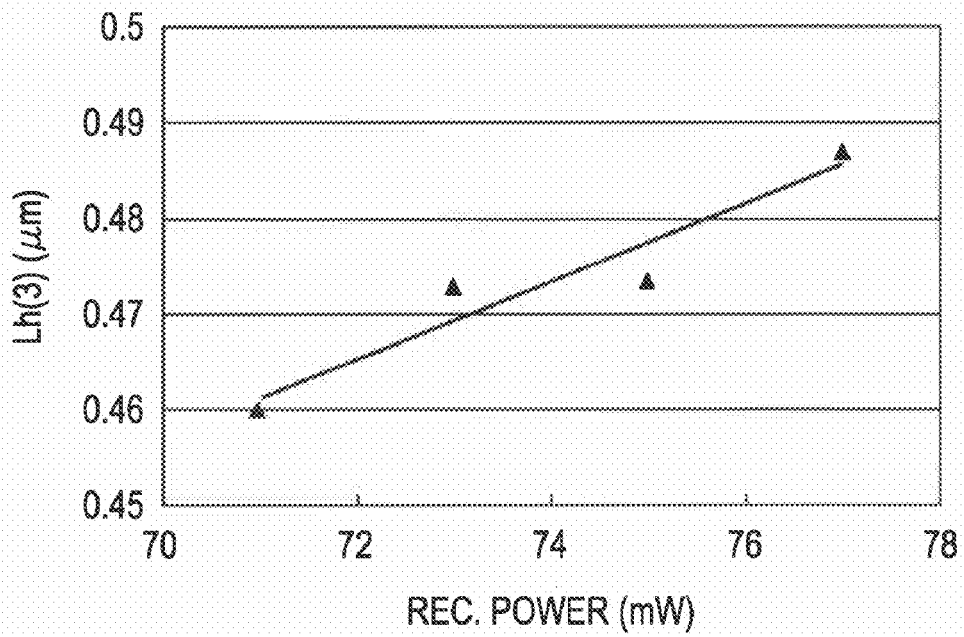
FIGS. 12A and 12B are explanatory diagrams illustrating relationships between an opening-mark length and recording laser power.
Figure 12B:
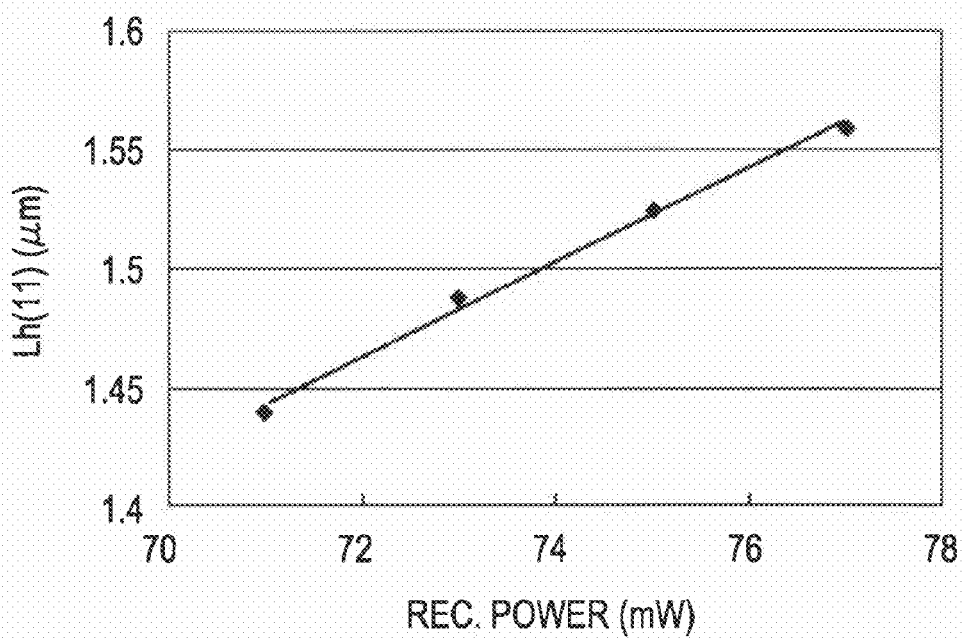

FIG. 12A shows a relationship between a recording laser power and a length $Lh(3)$ of the 3T mark, and FIG. 12B shows a relationship between a recording laser power and a length $Lh(11)$ of the 11T mark.

Figure 13A:
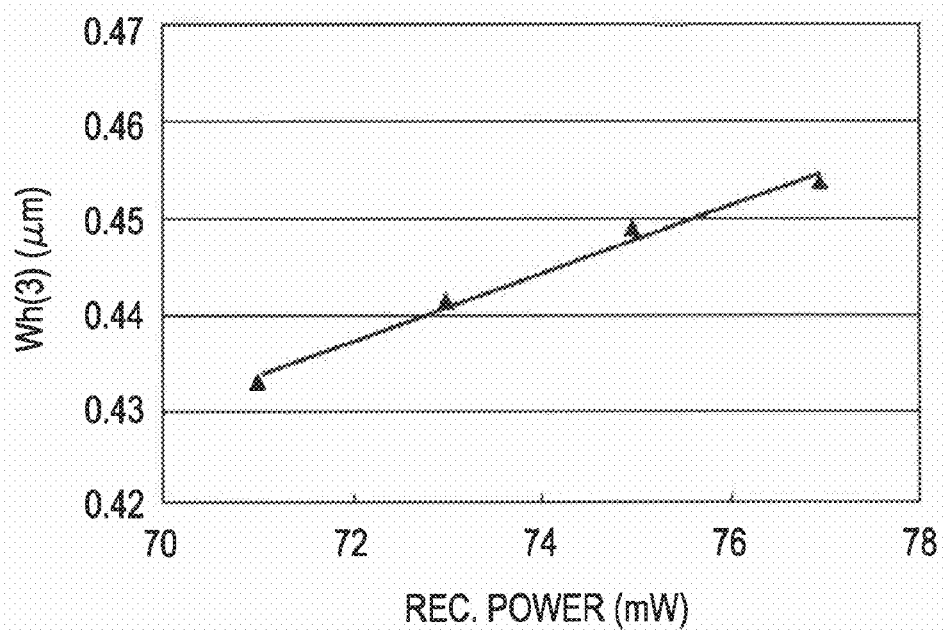
FIGS. 13A and 13B are explanatory diagrams illustrating relationships between an opening-mark width and recording laser power.
Figure 13B:
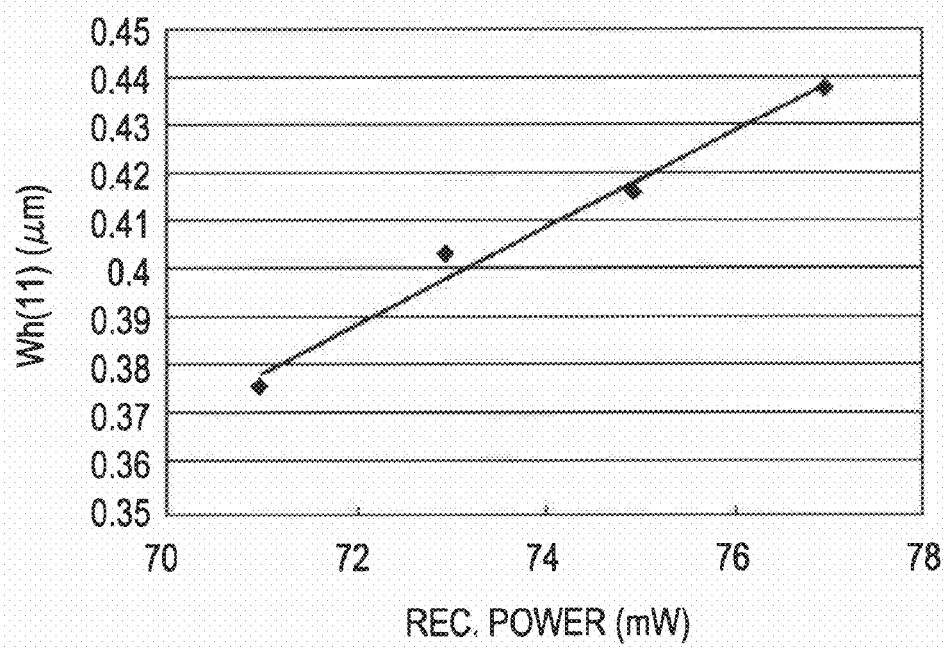

Also, FIG. 13A shows a relationship between a recording laser power and a width $Wh(3)$ of the 3T mark, and FIG. 13B shows a relationship between a recording laser power and a width $Wh(11)$ of the 11T mark.

As shown in FIGS. 12A, 12B, 13A, and 13B, it is possible to control the width and the length of the opening mark 6 by the recording laser power at the 3T mark and 11T mark.

In this regard, in this experiment, the relationships with the width and the length of an opening mark are obtained as shown FIGS. 12A, 12B, 13A, and 13B by fixing the pulse emission time, and changing the recording laser power. However, it is also possible to control the width and the length of the opening mark by changing the pulse emission time to change the amount of light energy. In that case, the relationships become different from those graphs in FIGS. 12A, 12B, 13A, and 13B, but it is possible to control the width and the length of an opening mark 6 by the recording laser power and the pulse emission time.

In the following, a description will be given of an experiment result in which a confirmation is made that it is possible to detect a signal from a DVD produced as a playback-only optical disc 90 on which additional information is recorded by a recording data string of opening marks 6 without the necessity of a playback apparatus having a special reading function.

In the experiment, an optical disc substrate having a plurality of an additional-information recording sections 10 in a content area was provided. An Al alloy film having a thickness of about 35 nm and having a composition different from that of the Al alloy film used in FIG. 6 is formed on the substrate, and a dummy optical disc substrate is boded thereon to produce a playback-only DVD.

The length X (refer to FIG. 4) in the track line direction of the additional-information recording section 10 was determined to be about 40 μm.

Next, additional information is formed by opening marks 6 on all the plurality of additional-information recording sections 10 such that the EFM+ signal after playback signal detection is correctly decoded in consideration of the information data of the pit strings preceding and succeeding individual additional-information recording sections 10. For the additional-information recording apparatus 150 used for forming opening marks, a high-output laser writer having an optical system having a wavelength of 650 nm and a objective lens of NA0.60 was used.

If the additional information has not been recorded on the additional-information recording sections 10 successfully, decoding errors increase, and the disc becomes incapable of being read in the worst case.

In this experiment, a playback-only optical disc 90 (DVD) is provided by having information recorded on the additional-information recording sections 10 using the laser output of the additional-information recording apparatus 150 determined to be 78 mW on the disc surface.

Next, each one apparatus is selected from commercially available DVD players produced by seven manufacturers, and playback tests were performed using each one of the apparatuses. As a result, it was possible to read the additional information by all the seven apparatuses without encountering a decoding error.

Next, in order to observe a state of a pre-pit signal string and an opening mark string, the playback-only optical disc 90 (DVD) was stripped off at the portion of the adhesive 5, and the reflective-film added surface of the reflective-film-formed optical disc substrate 95 having a thickness of 0.6 mm was observed by the scanning electron microscope (SEM).

Figure 14:
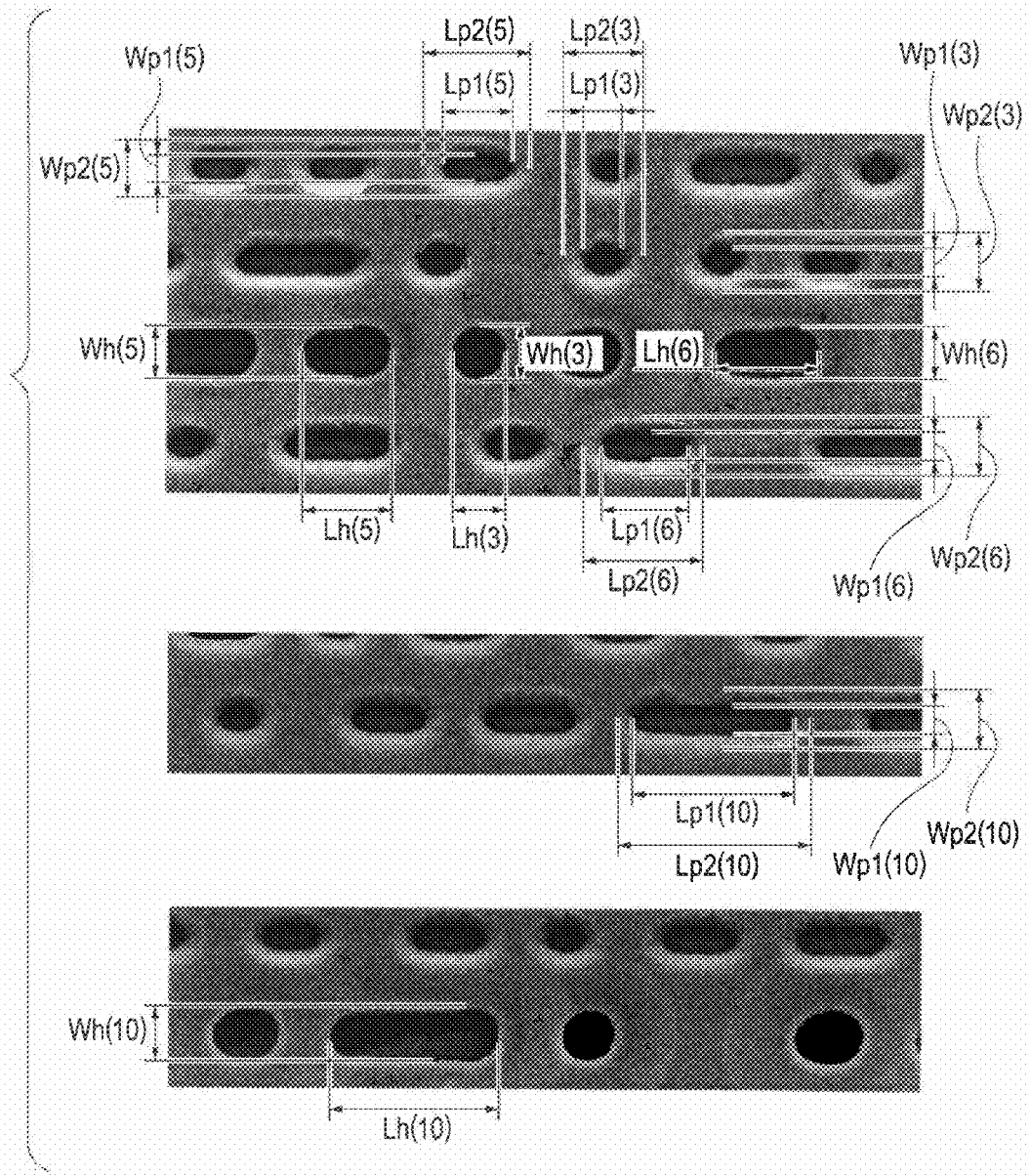
FIG. 14 is explanatory diagrams, using a SEM photograph, of an example of an experiment of the playback-only optical disc according to the embodiment.

FIG. 14 is an observation image by both a secondary electron and reflective electron at a magnification of 10,000, of which appropriate portion for measuring a length and a width has been extracted.

FIG. 15 illustrates measurement values, by comparison, of the length and the width corresponding to 3T, 5T, 6T, and 10T out of the pre-pit signal strings and opening mark signal strings. It was identified that at any of 3T, 5T, 6T, and 10T, the following relationships are satisfied:

$$Lh(n)>Lp1(n) \quad \text{(Expression-1)}$$

$$Wh(n)>(Wp1(n)+Wp2(n))/2 \quad \text{(Expression-2)}.$$

As described above, the length and the width of an opening mark 6 increase or decrease in accordance with an increase or a decrease of the laser output of the additional-information recording apparatus 150. It is understood that if the output is small, a decoding error occurs when the disc is played back by a commercially available DVD player. The reason for this is that the signal modulation degree of an opening mark signal is small compared with the signal modulation degree of a pre-pit signal. Thus, the above error is caused by the fact that either one of or both of the above-described Expression-1 and Expression-2 are not satisfied.

By the above result, it was verified that a playback-only optical disc 90 of the present embodiment, on which additional information is recorded by opening marks 6 satisfying Expression-1 and Expression-2 can be played back using a usual commercially available DVD player without the necessity of a special reading apparatus.

In this regard, in the embodiments, descriptions have been given of an example in which the present invention is implemented as a DVD-type playback-only optical disc 90. However, the present invention can be applied to another disc-type optical disk read only memory and the production method thereof.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk read only memory having an information recording surface having a concave-convex pattern formed on the basis of a first modulation signal and a reflective film covering the information recording surface, and including a recording track formed by the concave-convex pattern as a first recording data string including a pit and a land, the optical disk read only memory comprising:

an additional information recording section disposed on the recording layer being planar on the recording track having the first recording data string including the pit and the land; and a second recording data string including a mark of removing or reducing the reflective film in the additional information recording section on the basis of a second modulation signal in the additional information recording section, wherein a modulation method of information data at the time of forming the first recording data string and a modulation method of information data at the time of forming the second recording data string are identical, and $$Lh(n)>Lp1(n) \quad \text{(Expression-1)}$$

and $$Wh(n)>(Wp1(n)+Wp2(n))/2 \quad \text{(Expression-2)}$$

are satisfied;

where a reference clock cycle of the modulated information data is T, an information-data length is nT (n is a natural number), a length of the mark corresponding to nT is Lh(n), a width of the mark corresponding to nT is Wh(n), a length of a base of a truncated cone of the pit corresponding to nT is Lp1(n), a width of the base of the truncated cone of the pit corresponding to nT is Wp1(n), a length of a top surface of the truncated cone of the pit corresponding to nT is Lp2(n) being longer than Lp1(n), and a width of a top surface of the truncated cone of the pit corresponding to nT is Wp2(n) being longer than Wp1(n).

2. The optical disk read only memory according to claim 1, wherein a plurality of information recording surfaces are provided as the information recording surface, one of the information recording surfaces is covered with a total reflective film as the reflective film, the other of the information recording surfaces is covered with a translucent reflective film, the additional information recording section is disposed at least on the information recording surface covered with the total reflective film, and relationships of Expression-1 and Expression-2 are satisfied between the mark and the pit.

3. The optical disk read only memory according to claim 1, wherein a plurality of information recording surfaces are provided as the information recording surface, one of the information recording surfaces is covered with a total reflective film as the reflective film, the other of the information recording surfaces is covered with a translucent reflective film, the additional information recording section is disposed at least on the information recording surface covered with the translucent reflective film, and relationships of Expression-1 and Expression-2 are satisfied between the mark and the pit.

* * * * *

UNITED STATES PATENT AND TRADEMARK OFFICE
CERTIFICATE OF CORRECTION

| | | |
|---|---|---|
| PATENT NO. | : 7,911,929 B2 | Page 1 of 1 |
| APPLICATION NO. | : 12/329024 | |
| DATED | : March 22, 2011 | |
| INVENTOR(S) | : Sakamoto et al. | |

It is certified that error appears in the above-identified patent and that said Letters Patent is hereby corrected as shown below:

On the title page, Item (75), the seventh inventor's country of residence is incorrect. Item (75) should read:

--(75) Inventors: Tetsuhiro Sakamoto, Kanagawa (JP); Jun Nakano, Tokyo (JP); Takayuki Asahina, Shizuoka (JP); Hideo Kawachi, Tokyo (JP); Yoshitake Yanagisawa, Shizuoka (JP); Makoto Tsukahara, Shizuoka (JP); Inho Cho, Gyeongsangnam-do (KR)--

Signed and Sealed this
Twenty-eighth Day of June, 2011

David J. Kappos
*Director of the United States Patent and Trademark Office*